(12) United States Patent
Laaksonen et al.

(10) Patent No.: US 10,572,013 B2
(45) Date of Patent: Feb. 25, 2020

(54) HAPTIC FEEDBACK REORGANIZATION

(71) Applicant: Nokia Technologies Oy, Espoo (FI)

(72) Inventors: Lasse Juhani Laaksonen, Tampere (FI); Mikko Tapio Tammi, Tampere (FI); Arto Juhani Lehtiniemi, Lempaala (FI); Miikka Tapani Vilermo, Sluro (FI)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 15/283,822

(22) Filed: Oct. 3, 2016

(65) Prior Publication Data

US 2018/0095535 A1    Apr. 5, 2018

(51) Int. Cl.
| | |
|---|---|
| *G06F 3/01* | (2006.01) |
| *G06F 1/16* | (2006.01) |
| *G06F 3/0488* | (2013.01) |
| *G06F 3/0354* | (2013.01) |
| *G06F 3/041* | (2006.01) |

(52) U.S. Cl.
CPC .............. *G06F 3/016* (2013.01); *G06F 1/163* (2013.01); *G06F 3/03547* (2013.01); *G06F 3/0488* (2013.01); *G06F 3/0414* (2013.01); *G06F 2203/04809* (2013.01)

(58) Field of Classification Search
CPC ..... G06F 3/016; G06F 3/011; G06F 2203/014
See application file for complete search history.

(56) References Cited

U.S. PATENT DOCUMENTS

| | | | |
|---|---|---|---|
| 8,441,465 B2 | 5/2013 | Radivojevic et al. | |
| 8,704,776 B2* | 4/2014 | Kim .................. | G06F 3/016 |
| | | | 345/156 |
| 8,717,151 B2 | 5/2014 | Forutanpour et al. | |
| 8,723,810 B2* | 5/2014 | Kim .................. | G06F 3/016 |
| | | | 345/156 |
| 8,803,795 B2 | 8/2014 | Grant et al. | |
| 8,922,507 B2* | 12/2014 | Motoyama ............ | G06F 3/041 |
| | | | 345/173 |
| 9,189,932 B2 | 11/2015 | Kerdemelidis | |
| 2010/0231540 A1 | 9/2010 | Cruz-Hernandez et al. | |
| 2013/0127735 A1* | 5/2013 | Motoyama ............ | G06F 3/041 |
| | | | 345/173 |
| 2013/0307786 A1 | 11/2013 | Heubel | |

(Continued)

FOREIGN PATENT DOCUMENTS

WO    2007/121557 A1    11/2007

OTHER PUBLICATIONS

Mander, Richard, et al., "A 'Pile' Metaphor for Supporting Casual Organization of Information", ACM, May 3-7, 1992, pp. 627-634.

*Primary Examiner* — Patrick F Marinelli
(74) *Attorney, Agent, or Firm* — Harrington & Smith

(57) ABSTRACT

A method including providing haptic feedback to a user along a surface of a touch interactive device in use; and changing the haptic feedback to the user during a touch motion on the touch interactive device, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation.

19 Claims, 9 Drawing Sheets

(56) References Cited

U.S. PATENT DOCUMENTS

| | | | |
|---|---|---|---|
| 2013/0346892 A1* | 12/2013 | Wren | G06F 3/04883 |
| | | | 715/765 |
| 2015/0097786 A1* | 4/2015 | Behles | G06F 3/041 |
| | | | 345/173 |
| 2015/0177891 A1* | 6/2015 | Karkkainen | G06F 3/045 |
| | | | 345/174 |
| 2015/0293590 A1* | 10/2015 | Lehtiniemi | G06F 3/016 |
| | | | 715/702 |
| 2015/0302709 A1 | 10/2015 | Fadell et al. | |
| 2016/0011664 A1* | 1/2016 | Silvanto | G06F 3/016 |
| | | | 345/156 |
| 2017/0011210 A1* | 1/2017 | Cheong | H04W 12/06 |
| 2017/0060239 A1* | 3/2017 | Lim | G06F 3/016 |
| 2019/0050113 A1* | 2/2019 | Choi | G06F 17/27 |

* cited by examiner

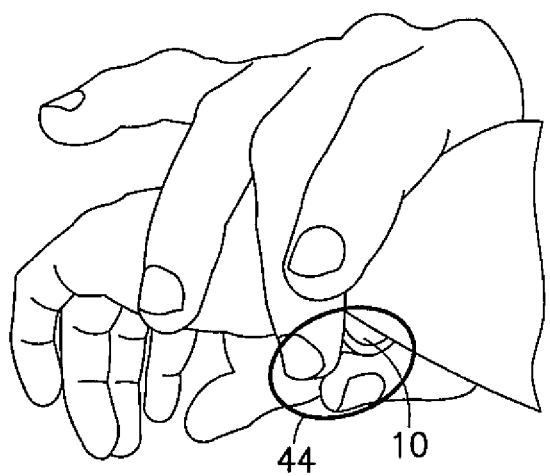
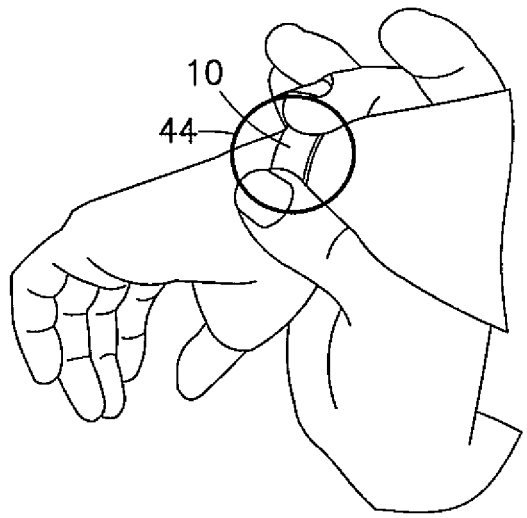
FIG.5A
FIG.5B
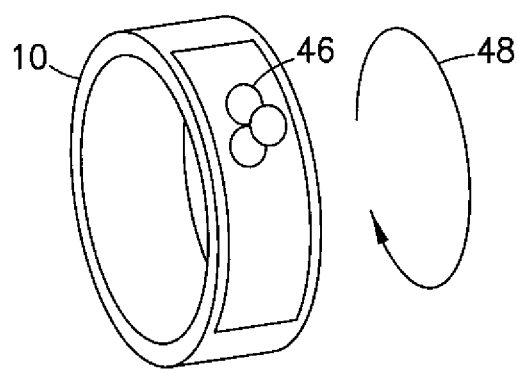
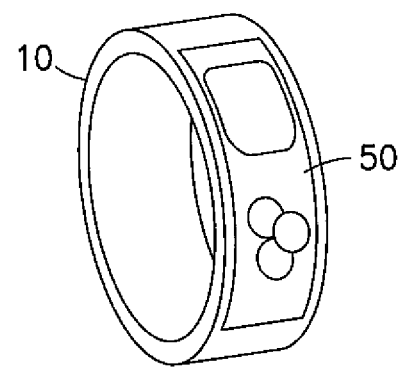
FIG.6A
FIG.6B

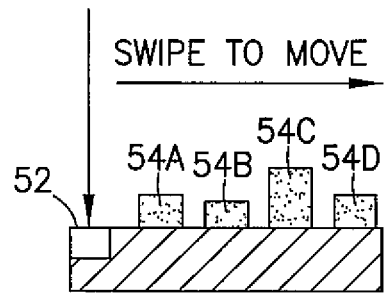
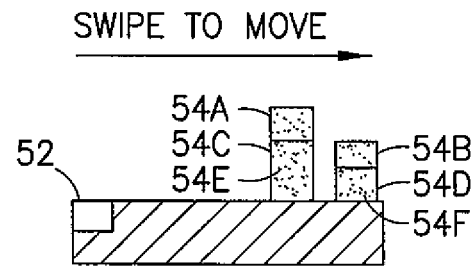
FIG.7A FIG.7B
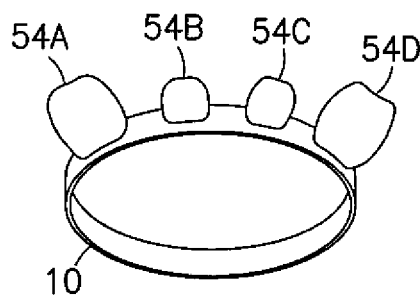
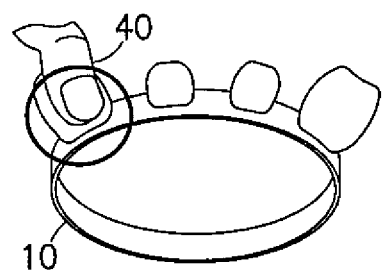
FIG.8A FIG.8B
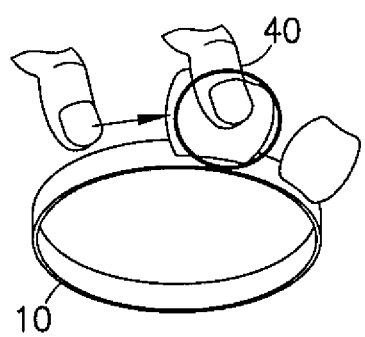
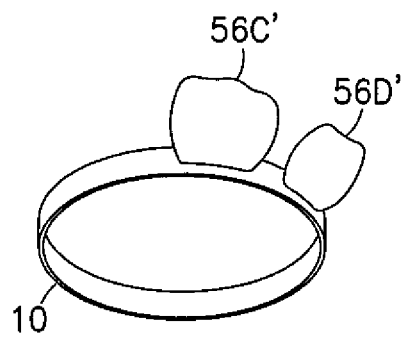
FIG.8C FIG.8D

US 10,572,013 B2

HAPTIC FEEDBACK REORGANIZATION

BACKGROUND

Technical Field

The exemplary and non-limiting embodiments relate generally to haptic feedback and, more particularly, to organizing haptic feedback.

Brief Description of Prior Developments

Haptic feedback is used on touch screens, such as on a touch screen of a smart phone for example.

SUMMARY

The following summary is merely intended to be exemplary. The summary is not intended to limit the scope of the claims.

In accordance with one aspect, an example method comprises providing haptic feedback to a user along a surface of a touch interactive device in use; and changing the haptic feedback to the user during a touch motion on the touch interactive device, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation.

In accordance with another aspect, an example apparatus comprises at least one processor; and at least one non-transitory memory including computer program code, the at least one memory and the computer program code configured to, with the at least one processor, cause the apparatus to: provide haptic feedback to a user along a surface of a touch interactive device of the apparatus in use; and change the haptic feedback to the user during a touch motion on the touch interactive device, where the touch interface device is configured to perform at least one operation based upon at least a portion of the touch motion, where the at least one operation provides information associated with the at least one operation separate from the haptic feedback, and where the changing of the haptic feedback is based at least partially upon at least one of the information and the at least one operation.

In accordance with another aspect, an example apparatus is provided in a non-transitory program storage device readable by a machine, tangibly embodying a program of instructions executable by the machine for performing operations, the operations comprising: providing haptic feedback to a user along a surface of a touch interactive device in use; and changing the haptic feedback to the user during a touch motion on the touch interactive device, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation.

BRIEF DESCRIPTION OF THE DRAWINGS

The foregoing aspects and other features are explained in the following description, taken in connection with the accompanying drawings, wherein:

FIGS. 5A-5B shows one example of a user operating the apparatus shown in FIG. 1;

FIGS. 6A-6B illustrate how a display on the apparatus may change with the use shown in FIGS. 5A-5B;

FIGS. 7A-7B illustrate an example method of haptic feedback on the apparatus indicating organization of information and resultant movement to change that information organization;

FIGS. 8A-8D illustrate another example of information reorganization and resultant haptic feedback reorganization;

DETAILED DESCRIPTION OF EMBODIMENTS

Figure 1:
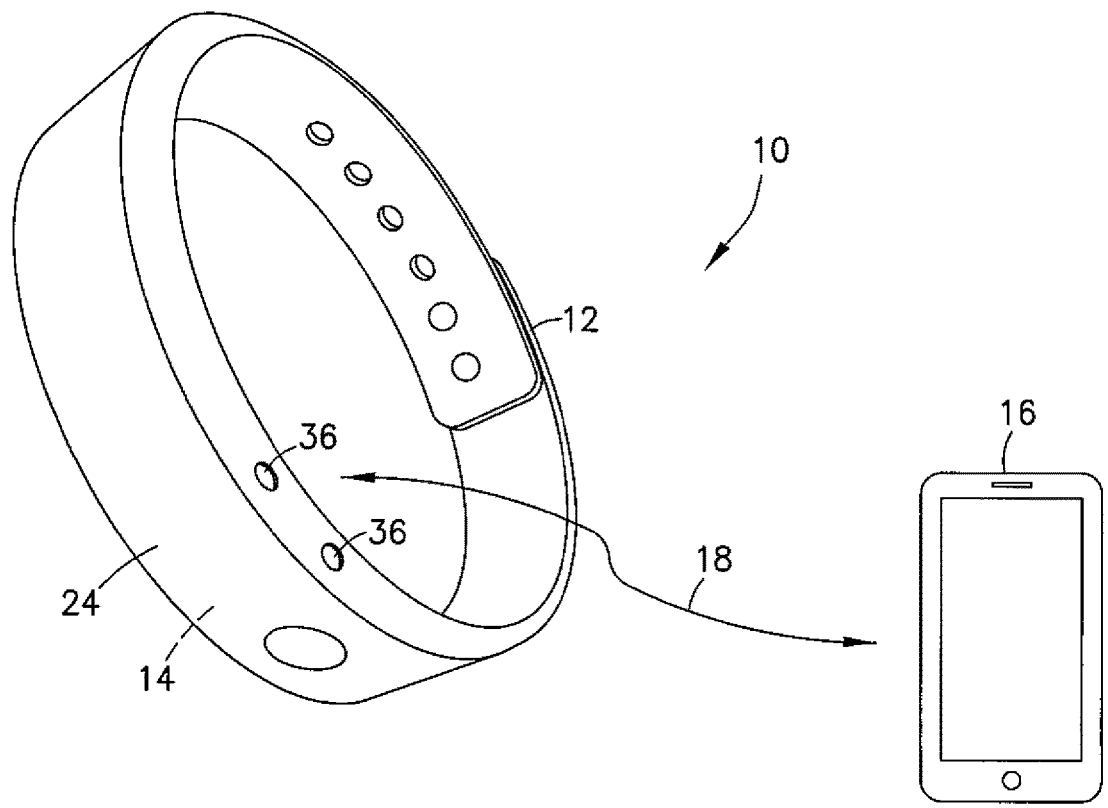
FIG. 1 shows an example embodiment of an apparatus comprising features as described herein.

Referring to FIG. 1, there is shown an apparatus incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 in this example is a wearable device (a device intended to be worn by a user). However, features as described herein may be used with a non-wearable device. In this example, apparatus 10 is a bracelet type of device adapted to be worn on a wrist of the user. However, features as described herein may be used on any suitable type of wearable device. The apparatus 10 has a frame 12 and electronic circuitry 14. The electronic circuitry 14 is configured to communicate wirelessly with another device 16, such as a smart phone for example. In alternate examples the connection 18 might be a removable wired connection or, alternatively, the apparatus 10 may not be adapted to communicate with another device.

Figure 2:
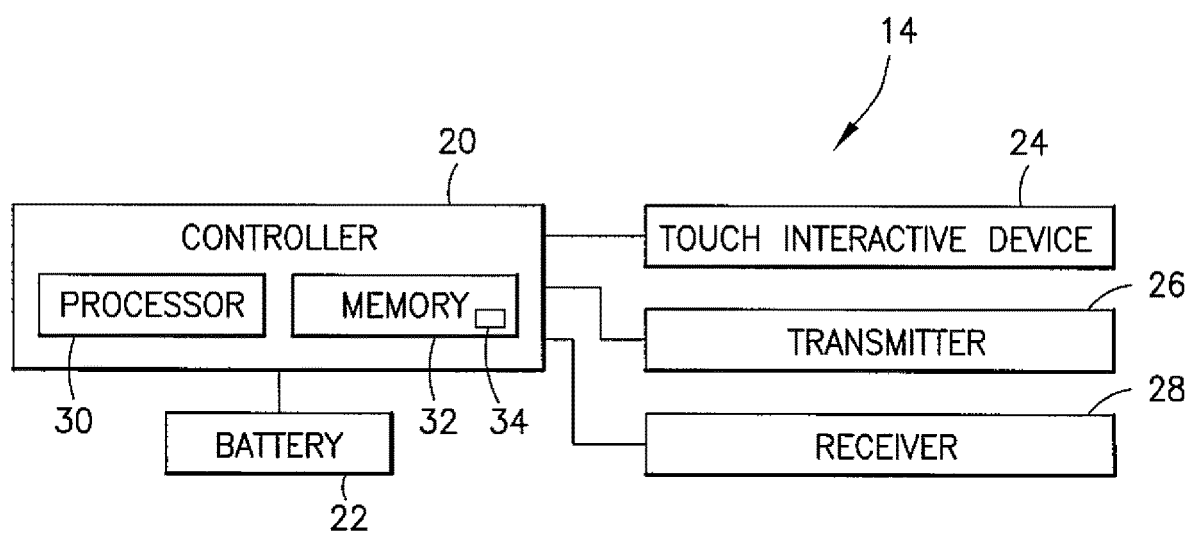
FIG. 2 is a diagram illustrating some of the components of the apparatus shown in FIG. 1.

Referring also to FIG. 2, the electronic circuitry 14 may comprise, but is not necessarily limited to, a controller 20, a battery 22, a touch interactive device 24, a transmitter 26 and a receiver 28. More or less components may be provided. The controller 20 comprises at least one processor 30 and at least one memory 32 including software or computer code 34. The apparatus 10 may also include an additional user input, in addition to the touch interactive device 24, such as buttons 36 shown in FIG. 1. The touch interactive device 24 may comprise a display having a touch screen for example, or may comprise a touch interactive device which does not have a display.

Features of the apparatus 10 provide an intuitive user interface (UI) at the touch interactive device 24 where information may be presented to the user by means of an organized haptic feedback. The haptic feedback may be provided as one or more individually sensible haptic events. The locations of the haptic events may be able to be organizationally moved on the surface of the touch interactive device 24, and may be additively or subtractively combined. One example of an individually sensible haptic event is a sandpile. The sandpile is a virtual shape which simulates sand, such as sand being moved for example. Analogous virtual sandpile-type of haptic events are the sensing of clay being molded, or a semi-fluid material being pushed by the touch of the user on the touch interactive device 24. The user may configure how to organize the haptic feedback such that the user can define a particular haptic feedback pattern, sandpile sensitivity, frequency of sandpiles, etc. so that when such haptic feedback is provided from the wearable device, the user can, for example, associate what information (or content of information) is taking place or has been missed. The haptic feedback may be provided, for example, when the user touches the touch interactive device 24 or when an event occurs or is missed. A user may use suggested daily activities such as calendar events, meetings, alarms, etc. Tactile Audio Display (TAD) implementation, or any other haptic feedback implementation may be used to enable this solution, such as described in U.S. Pat. No. 8,441,465 which is hereby incorporated in its entirety herein. The direction and sensitivity of such haptic feedback may also be used to give an indication to the user, such as how far the user is away from the target event or to provide an indication how long ago the event was occurred for example. For the apparatus 10, where the wearable device is a bracelet (regardless the user is left handed or right handed), a localized haptic feedback in the clockwise direction can indicate the event is to occur, whereas an counter-clockwise direction can indicate the event occurred in the past relative to the present time. This is merely an example. With a Tactile Audio Display (TAD) implementation, for example, one may include audio information as well as haptic feedback. In the example apparatus 10 shown in FIG. 1, the wearable device may analyze the current situation relative to one or more target goals and, accordingly, present one or more indications by means of haptic feedback and/or audio. The user does not need to visually see such information during presentation.

In another type of example, features may be related to a portable device (such as a wearable device) where virtual reality is enabled by means of haptic feedback and/or sound. In this category, a user may present use cases such as Zooming, Calendar, Folders where the user can compile, move and adjust events (any use case that presents information to the user and can be moved or organized), such as in a sandpile-like configuration or understand content information by receiving indication based on the haptic feedback/audio information. In this type of use case the user can adjust and locate individual sandpiles (individually sensible haptic event) to anywhere in the display area or each use case can present content information by means of sandpile-like movement and/or sandpile-like resultant configuration (such as additive or subtractive for example) to present contextual data. This invention can be considered as an enhanced version of existing presentations where they are, mostly visual; whereas features as described herein may be used to add virtual reality by means of sound and haptic feedback. In this example no comparison is needed, unlike the first example noted above, but content is simulated to the user.

Regarding the haptic feedback sensation described above and referred sometimes herein as a sandpile, sand is a material which people have commonly grown used to handle or sense; perhaps ever since their childhood days playing in a sandbox or at the beach. Most people know how sand feels against their hand to process it such as, for example, how to make a pile of sand, how to dig a hole into it, or how to smooth the surface of sand. A feature as described herein is to use this tactile sensation and apply it to a touch interactive device of an electronic apparatus such as, for example, a wearable device with a tactile audio display or other surface capable of providing a tactile feedback that can take various forms. The feeling of surface resistance can be modified to provide this sandpile effect. This sand simulation (or molded/molding clay simulation or semi-fluid material simulation) enables more rich and intuitive interaction with a wearable device. A user may be able to "feel" the surface of their device as a small sandbox where there can be one or more piles of sand (or holes) in different positions which can be reorganized; perhaps additively or subtractively for example. The user is, thus, able to analyze and modify information content, as virtually represented on the surface of the touch interactive device, by moving his/her finger on top of the surface. This allows for viewing and organizing information and functionalities and, depending on applications, there may even be a possibility for the user to analyze the actual content of information. Modification interactions include, for example, pushing the sand to a selected location to make a pile or smoothing the surface across the whole display area. Examples of different surface shapes are provided in FIG. 3A-3D.

Figure 3A:
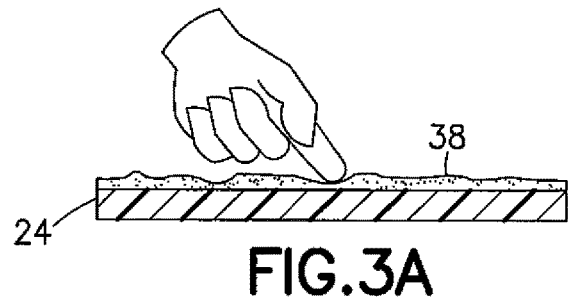
FIGS. 3A-3D are illustrations showing virtual haptic feedback shapes.

As seen in FIG. 3A, a user's finger may be used to sense the shape of the virtual, simulated sand 38 on the surface of the touch interactive device 24. The virtual sand 38 may be moved to take different shapes as illustrated by the flattened shape shown in FIG. 3B, the sandpile shown in FIG. 3C and the hole shown in FIG. 3D. These are merely some examples and should not be considered as limiting. It should be noted that the simulated shapes need not be realistic. The simulated shape(s) may be exaggerated. For example, referring to FIG. 4, one would not expect a pile of sand to stick to a surface in a way that does not obey gravity such as 42A for example. As noted above, the organization or shaping of the virtual sand, may be accomplished based upon a touch input by the user on the touch interactive device 24 and/or programming in the apparatus 10; such as including information content or organization.

Figure 4:
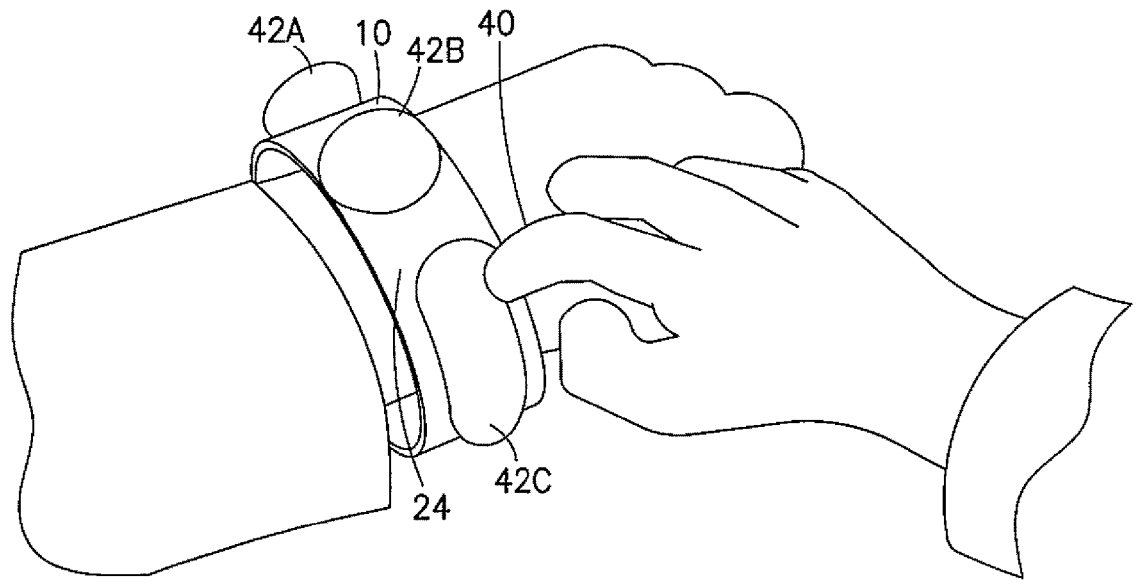
FIG. 4 is a diagram illustrating the apparatus shown in FIG. 1 used by a user and illustrating some virtual haptic feedback shapes.

Referring also to FIG. 4, the apparatus 10 is shown on a wrist of a user with the user touching the touch interactive device 24 with a finger 40. FIG. 4 also illustrates virtual haptic feedback effects as sandpiles 42A, 42B, 42C which could be sensed by the user's finger 40 if located at those locations on the touch interactive device 24.

In this example the touch interactive device 24 is divided into sub-sections along its length. The sub-sections may correspond to different information, such as days of the week, hours of a day and minutes of the day. Each sub-section may contain an amount of virtual "sand". The user feels a larger amount of virtual sand as a greater amount of tactile feedback. When the user swipes along the touch interactive device 24, he/she can feel the amount of sand in each sub-section. FIG. 4 illustrates a user feeling shapes or textures on the apparatus 10 as a smart bracelet. The same procedure may be used for organizing content. For example, when a software editing mode is active, the user may use the touch of the finger 40 to move the virtual sand into different sub-sections, different shapes and/or different size sandpiles. A default operation may be the viewing/sensing of content rather than editing of content or editing of content organization. User input could be used to switch between the default viewing/sensing of content editing of content such as by using the buttons 36 for example.

Tactile audio display (TAD) may comprise a device where a display window is mechanically driven with one or more actuators. The display is able to provide user feedback at different frequency bands. This enables, for example, providing a feeling of different materials or simple shapes. TAD properties may be utilized to inform the user about the status of an application or about the progress of an action he/she is performing. This may be done by imitating the behavior of sand in a sandbox or of liquid on a surface, etc.

At low frequencies (below about 300 Hz) tactile sensation is mostly related to the displacement of the surface. Sensitivity decreases above that frequency range, while at the same frequencies the sound radiation is related to the (volume) acceleration of the vibrating surface. Thus, concentrating the "haptic only" interface to the lower frequencies, and at the same time possibly removing the lowest frequency content from other signals going to the same actuator(s), the haptic and non-haptic interactions can be kept perceptually separate.

Measurements and listening experience from Tactile Audio Devices indicate this kind of behavior the acoustic output below the lowest diaphragm resonance (typically 300-600 Hz) is very poor, but the vibration is easy to feel. Also, the spatial distribution of the surface vibration changes around the resonance. At the lowest frequencies, there is simple bending with some vibration at every point of the surface. At higher frequencies, where the acoustical output is more significant, the vibration pattern becomes more irregular and, thus, less suited for consistent tactile feedback. Further perceptual separation may be achieved by using distinctly different patterns for low-frequency tactile output and the acoustic output (e.g., different lengths, envelopes). Alternatively, an implementation such as given in U.S. Pat. No. 8,441,465 may be utilized. In further implementations, at least some aspects may be utilized via use of a vibration motor.

FIGS. 5A and 5B illustrate a user interacting with the apparatus 10 by initially grasping the apparatus 10 with his/her free right hand, as seen FIG. 5A. The user's palm and fingers cover the length of the apparatus 10 except for the "hole" or "gap" between the tips of the user's thumb and middle finger. This "hole" is indicated by a circle 44. Content or content type may be presented to the user via haptic feedback according to a first setting or view of the content. The user is able to browse the content or content types, such as for example a timeline of calendar events, by rotating the right hand grasping the apparatus 10, as illustrated by comparing FIG. 5B to FIG. 5A. The direction, speed, and extent of the rotation may be measured in relation to the first setting/view by detection of the position of the "gap". The pattern of the haptic feedback may be altered based on how the content changes between the two views. As the user lets go of the apparatus 10 with his/her right hand, the view has changed from a first setting to a second setting. It is understood that the user's hand has blocked the display (if there is one on the apparatus 10) and the user has, thus, manipulated the device eyes-free. However, the user's action may result in a change from a first display view as illustrated in FIG. 6A to a second display view as illustrated in FIG. 6B where the image 46 shown in FIG. 6A has been rotated and changed in direction 48 to the new image 50. Thus, FIGS. 5A-5B and 6A-6B illustrate a change from a first view corresponding to a first setting to a second view corresponding to a second setting, where the change corresponds to a user control of the device through an eyes-free or visually-blind haptic feedback interaction.

A recent trend has been wearing of an activity bracelet by a user which measures user activity during the day or during a set period of time. A target activity for the day can be defined, and the device can inform how the user has so far progressed during the day (see Nike Fuelband SE for an example). In general, the display of the bracelet has low resolution and limited functionalities. With the apparatus 10 provided as an activity bracelet for example, a TAD feature can be included in the bracelet surface. By activating an analysis mode the user can feel how his/her activity has evolved during the day. As the bracelet informs the user how he/she has so far met the daily target, it may also alarm the user if it seems the target will not be met. The bracelet may react to the missed or to be missed targets such as, for example, by:

1) Proposing ways to achieve the target efficiently in a shorter timeframe
2) Notifying the user that the amount of activity is unrealistic within the set time range
3) Giving meaningful status updates: the bracelet knows when the user is planning to be active and when not to disturb The bracelet 10 may also be able to monitor the activity progress within shorter time ranges rather than only monitoring daily targets. When missing one or more "sandpiles" of activity, the device can change the daily activity plan accordingly and encourage the user to still reach the daily target.

Features as described herein may be used for checking calendar events. For example, the user may have set a priority level for calendar events. Alternatively, a calendar event may have a default priority, and the user may have set a higher priority for the event. The user may check the calendar events on the apparatus 10, such as merely by touch for example. If the user checks the upcoming event within a specific time window before the event, the touch by the user on the touch interactive device 24 may be sensed and input into the controller 20. This input may be used with the software program such that there may be no need to give an alert for that upcoming event. Or, in some embodiments, only high-priority events may trigger an alert in this case. However, if the user has not checked an upcoming calendar event within a specific time window before the event, an alarm may be automatically triggered.

In one type of example, the user may check future events in a forward or clockwise direction, and past or missed events in a backward or counter-clockwise direction. In some embodiments, the direction of the swipe may remap the events onto the active area of the bracelet. Note that this does not mean the event is moved, but instead that the presentation of the information is altered.

Features as described herein may be used for health care such as monitoring and reminding a user regarding a health care event or schedule. Patient monitoring is a task well suited for advanced wearable devices. A user may track their schedule to take pills on a wearable, such as a bracelet. The user may feel when the time to take their pills is approaching, or whether they have missed a scheduled event for taking a pill. The wearable UI may indicate how critical it is for the user to take the missed pills. The wearable apparatus 10 may further trigger contacting a health care provider, such as via connection 18 and device 16 shown in FIG. 1. The wearable apparatus 10 may be programmed to adjust the schedule of when to take a pill or how many pills to take based upon an event or missed event.

The UI may utilize the direction and length of the user's swipe as well as the sensitivity of the haptic feedback to indicate to the user various aspects. For example, how far away from a target event the user is (timewise), how far away from completion of a task the user is (rough "percentage" for example), etc.

In regard to editing, the display may have a position which enables editing mapped content, such as while holding a finger on top of a position on the surface. Thus, a user may hold one finger on the editing position and modifying the one or more "sandpiles" with another finger. This is illustrated in FIGS. 7A and 7B. As seen in FIG. 7A, the user may touch or hold area 52 with one finger to activate the editing mode. The user may then move the virtual sandpile 54A onto virtual sandpile 54C and move the virtual sandpile 54B onto virtual sandpile 54D. This creates new combined sandpiles 54E and 54F, respectively. Alternatively, the user may press the editing position to engage an editing mode, and then move the finger to adjust the content. This is illustrated in FIGS. 8A-8D, where the apparatus 10 has four virtual sandpiles 56A, 56B, 56C, 56D as shown in FIG. 8A. As seen in FIG. 8B, the user may take his/her finger 40 to select a sandpile; sandpile 56A in this figure. As seen in FIG. 8C, the user may then move his finger 40 to move the sandpile 56A to add to another sandpile. FIG. 8D shows an example where the two sandpiles 56A, 56B have been combined with the sandpile 56C to form the new larger sandpile 56C'.

In one example embodiment there may be an embedded LED to indicate the editing mode being enabled, such as at button 36 shown in FIG. 1. The part of the sand the user has moved may be a fixed amount or relative to the amount of sand in the sub-section from where the sand is moved. In some embodiments, the user may relocate sand from all the sub-sections which he touches (as seen in FIG. 8 where two piles are moved to a third pile to form one large pile with all activities allocated to same time), while in other embodiments, the user may relocate sand only from the sub-section (s) that he firstly selects.

If the display is pressure sensitive, the editing can easily be initiated by pushing the device stronger and simultaneously moving the content. A light pressure swipe in this case would allow the user to browse the content without modifying it.

Features as described herein may utilize a tactile audio display (TAD). The display may be able to provide user feedback at different frequency bands which enables, for example, providing a feeling of different materials or simple shapes. This may be used to inform the user about the status of an application or about progress of the action he/she is performing, such as by imitating the behavior of sand in the sandbox or of liquid on a surface and so on.

Features may utilize the fact that at low frequencies (below about 300 Hz) the tactile sensation is mostly related to the displacement of the surface, and the sensitivity decreases above that frequency range, while at the same frequencies the sound radiation is related to the (volume) acceleration of the vibrating surface. Thus, concentrating the "haptic only" interface to the lower frequencies, and at the same time possibly removing the lowest frequency content from other signals going to the same actuator(s) the haptic and non-haptic interactions can be kept perceptually separate.

Using the sandbox analogy given above, the user can modify the set target activity. For example, if originally the target has been to go jogging in the morning and it turns out this is not possible due to a business meeting, the user can enable an editing mode and move sand from the morning area of the bracelet to the afternoon when he/she expects to go to the gym instead. The bracelet then informs the user how he/she has so far met the daily target, and it may also alarm the user if it seems the target will not be met. Moving the daily activity targets enables more precise control over the activity distribution. The bracelet may react to the changes, such as for example pushing the whole target to the evening and
1) Propose ways to achieve the target efficiently in a shorter timeframe
2) Notify the user that the amount of activity is unrealistic within the set time range
3) Give meaningful status updates: the bracelet knows when the user is planning to be active and when not to disturb A calendar is often checked and used with a mobile device. Using TAD the user can feel which parts of the day or week are already busy/booked in an easy way and indicate where there are available slots to be booked. In addition if an important item appears at a particular time instant the user can, with the sandbox analogy, clean up the area for the new item by pushing other calendar events away and making room for something else. The moved events may be automatically updated also to other people who are sharing the same calendar events. The sand analogy enables also fuzzy calendar events. For example, a user can define during which month, week, day, or hour he approximately should perform some particular action. This may be done by moving the pile of sand associated to the particular task to the preferred location. In the beginning, the calendar might only provide a mild reminder, and then later in time provide a stronger notification (such as a larger sandpile for example) if the task is still undone. In one alternative example, the calendar application may prompt the user to create a regular calendar entry as the time for the fuzzy calendar event is approaching.

Figures 9A, 9B:
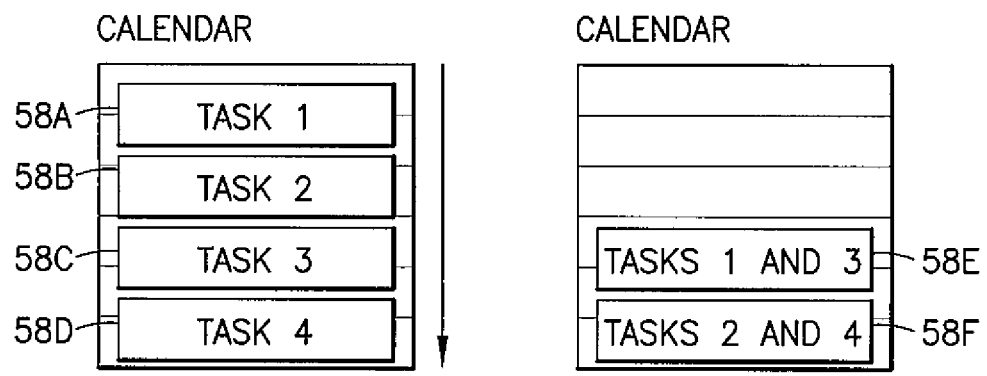
FIGS. 9A-9B illustrate tasks reorganized in a calendar.

The calendar event may be marked with different priority levels indicating if the timing of the event is exact, or if it can be modified within a given range. This information can be utilized when making room to the calendar i.e., flexible items may move first. FIGS. 9A and 9B present one example of making room in a calendar by using the procedure shown in FIGS. 7A and 7B, respectively. FIG. 9A shows four calendar based tasks 58A, 58B, 58C, 58D. These tasks 58 are presented on the touch interactive device 24 corresponding to the virtual sandpiles 54A-54D shown in FIG. 7A. When the virtual sandpiles 54A, 54B are moved to the positions shown in FIG. 7B to form the new sandpiles 54E, 54F, the tasks 58A, 58B are moved in the calendar to the new dates or time slots as shown by 58E and 58F.

The virtual sand methodology can also be applied to some basic touch UI operations such as zooming or scrolling for example. A zooming operation has analogy to digging a hole into the sandbox. The deeper the hole, the heavier the digging is and eventually such a tough ground is met that digging further is not possible and, thus, further zooming is not possible. With two finger pinch zoom this same experience can be delivered to a user where the feeling of resistance can be increased with increasing zoom.

The virtual sand/sandbox methodology may also be used to enhance the media browsing experience, such as using as a controller for media consumption. In this use case a bracelet may work as a controller for browsing a set of images. For example, each image folder may be represented by a pile of sand, and the height of the pile felt by the user may be proportional to the amount of images in the folder, or perhaps to the relevance of the images to the current context. For example, via a virtual sandpile, a folder with 100 images may appear larger than a folder with only five images. Alternatively, a folder that contains holiday photos with "Jack and Jill" in the photos may be presented in a virtual sandpile which appears more substantial than a virtual sandpile of a folder containing holiday photos with "Mary", when "Jack" and "Jill" are visiting the user.

Figure 10:
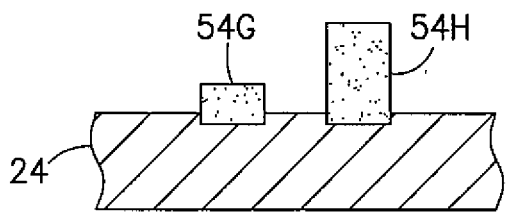
FIG. 10 illustrated haptic feedback for viewing photographs.

There may be further interactions besides the above. For example, the user may swipe to move a picture from a first pile to a second pile, and automatically view the next picture in the file corresponding to the first pile. While browsing, the user easily feels the size of the piles and can feel how many pictures are already viewed and how many pictures are still left in the folder. An example of this is shown in FIG. 10. FIG. 10 shows a first virtual sandpile 54G which corresponds to a first file having first photos stored in a memory. FIG. 10 shows a second virtual sandpile 54H which corresponds to a second file having second photos stored in the memory. With a swipe 60 of the user's finger on the touch interactive device 24, a photo from the first file or first pile can be moved into the second file or second file and, the two virtual sandpiles 54G, 54H may then be adjusted; such as 54G decreasing in size and 54H increasing in size for example.

A similar approach can be used for other media types for browsing. Other examples include feeling time-proportional aspects such as mapping a movie to the bracelet indicating the remaining time (and already watched parts) as piles. Additionally, in one type of example commercial breaks can be felt as holes/pits on the bracelet. The apparatus 10 can be used to at least partially control the device 16. For example, if the device 16 is a set top box or digital video recorder, the apparatus 10 may be used as a controller for one of these devices or otherwise connected to one of these devices such as for fast forwarding through commercial breaks for example.

A useful interaction for any editing is a resetting function or an undo function. This type of eyes-free UI may be used for relatively simple editing tasks such as, for example, to delay an activity to a later time in the day. For such edits an "undo" functionality may be very useful. A specific user interaction may be defined, in particular, for a bracelet-type device such as shown in FIG. 1. Alternatively, it can be used for other types of devices. The user may place one finger on the bracelet to allow editing, and move a second finger along the bracelet to move a sandpile. To undo this move, for example, the user might swipe over the whole display in the opposite direction (with editing still activated).

Figure 3B:
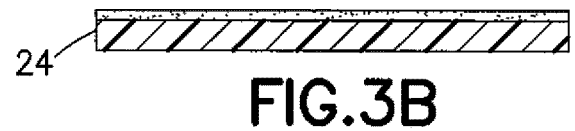
Figure 3C:
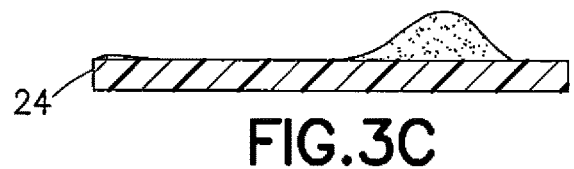
Figure 3D:
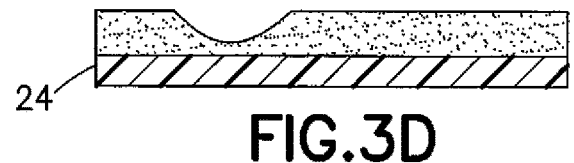

A set of optional additional interactions for a bracelet type of device may be provided. For example, for resetting the sandpile display to a zero state (which can be, for example, an even sand surface (such as shown in FIG. 3B. or the starting point of the whole editing session), the user may swipe the display sideways or laterally. For saving the latest edit state (to define a point to which the undo feature returns), the user might swipe the display in the direction of the latest edits, i.e., the user confirms the latest edit.

The invention relates to tactile audio displays (TAD) and other solutions that provide a tactile response as used on mobile devices, such as mobile phones, and wearable devices, such as smart watches or smart wrist bands/bracelets. Features as described herein may be used to address how to control methods, feedback and new advanced experiences to a user of a mobile or wearable device beyond UI solutions centered on visual information and sound. The TAD technology proposes a haptic feedback. Features as described herein may enable intuitive UI actions, such as organizing information relying on haptic feedback.

Currently, audiovisual feedback and interaction is most commonly utilized. Haptics based on simple techniques such as vibra may also be used in some cases. More recently, tactile audio displays (TADs) have been introduced to provide users more advanced haptic feedback, such as feeling of different texture types. However, the full potential of TADs in interaction has not been fully utilized yet. Features as described herein allow more potential of TADs in interaction to be fully utilized.

Features as described herein may be used to provide specifically organized haptic feedback to a user on a wearable device. In particular, the organized information and, thus, feedback may take the form of "sandpiles" the user feels on the surface. The feedback may be based on user-defined characteristics such as pattern, sensitivity, and frequency of the sandpiles. The user may associate what information has taken place (missed), is currently taking place or will take place. The user may also associate the content of the information based on the feedback.

Features as described herein allow for a user to "view eyes-free" organized elements such as calendar events or tasks, and in some embodiments even trigger functionalities, based on the feedback at a certain position on a display or wearable surface. The analogy used here is that the user has organized substance on the surface of the device, and can then feel the pattern and amount of the substance at a corresponding position of the surface. For example, the feel may be that of sand or a certain liquid.

Features as described herein may make use of haptic UI based on varying feel of surface resistance in organizing and modifying content across the screen of a portable device. The technology may be based on TAD or, for example, solutions such as described in U.S. Pat. No. 8,441,465 which is hereby incorporated by reference in its entirety. This allows for the user to allocate things, such as calendar reservations ("dinner with friends"), tasks ("mail a letter") or functionalities ("trigger the shutter to take a photo") to a certain position on the display that may in some embodiments further correspond to, for example, a time slot in a calendar.

Features as described herein may, thus, allow for the user to organize and observe information by touch without use of his/her eyes. The analogy used here is that the user moves substance on the surface of the device to the desired place, and can then feel the amount and position of the substance. This describes organizing and viewing information via feel. For example, the feel may be that of sand or liquid or fluid or semi-fluid.

With features as described herein, an intuitive touch based interaction method may be provided for various use cases. The proposed method does not require continuous visual monitoring. For example, the user does not need to look at a smart bracelet to feel the timing or distribution of an activity and to control the distribution. This enables a user to be in better control over the content, and allows dynamic and efficient content manipulation using the "sandpile" metaphor.

Changing of the haptic feedback and/or changing of at least one operation may be based, at least partially, upon a current position of the touch interaction (according to the touch motion). The "touch motion" aspect may infer a change of position. However, it may be the absolute position which is of interest and not a relative position (which is another way to understand position based on motion). Both absolute and relative may be relevant.

Figure 11:
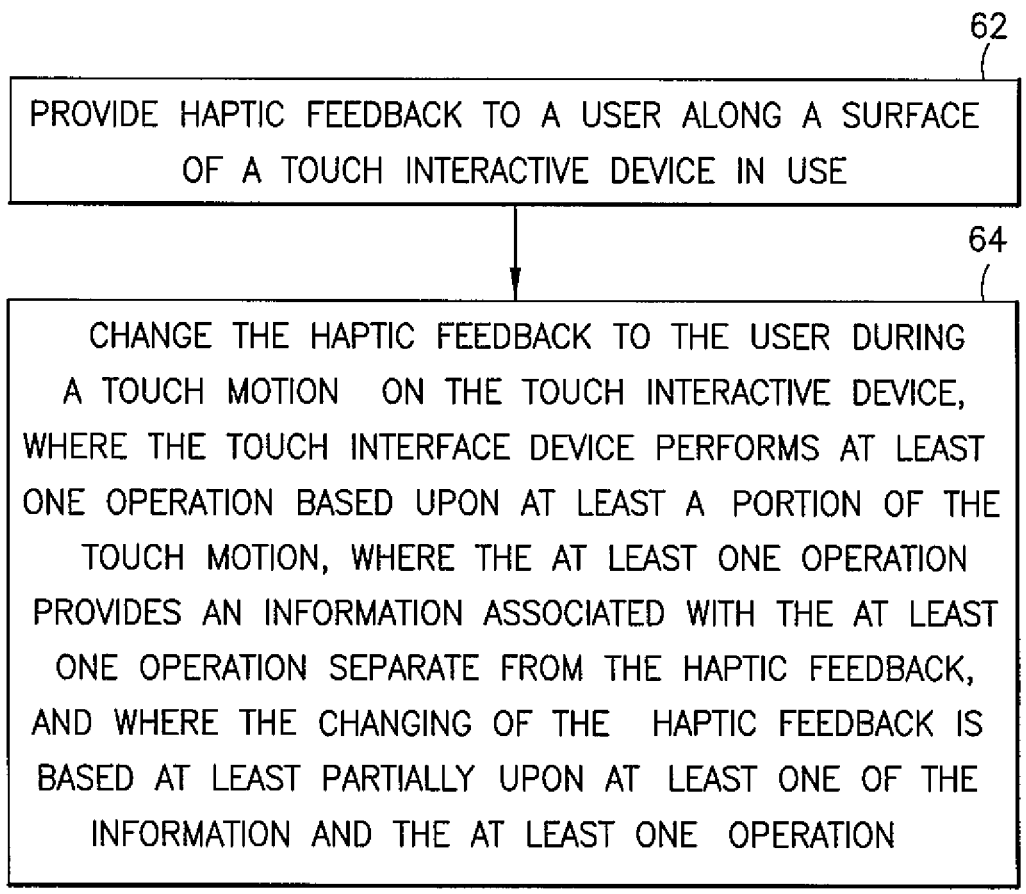
FIG. 11 is a diagram illustrating an example method.

Referring also to FIG. 11, an example method may comprise providing haptic feedback to a user along a surface of a touch interactive device in use as indicated by block 62; and, as indicated by block 64, changing the haptic feedback to the user during a touch motion on the touch interactive device, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation.

The touch interactive device may comprise a display comprising a touch screen and the haptic feedback is provided on the touch screen. Features as described herein may also work on surfaces which have no display/touchscreen, as long as there is provided a movable surface according to some embodiments and such movable surface can be suitably actuated. The haptic feedback may be varied on at least one portion of the touch interactive device to provide a virtual shape on the at least one portion of the touch interactive device; and changing the haptic feedback comprises changing the virtual shape of the at least one portion of the touch interactive device from a first shape to a second shape where a difference between the first shape and the second shape simulates an additive and/or subtractive movement of sand from a first location to a second location. The haptic feedback may be varied on at least one portion of the touch interactive device to provide virtual shapes having different heights simulating different height piles and/or holes. The haptic feedback may be varied on at least one portion of the touch interactive device to provide different patterns indicating different organizational content in a software application. The haptic feedback may be varied on at least two portions of the touch interactive device to provide a first virtual shape on a first one of the portions which increases in size while a second virtual shape on a second one of the portions decreases in size based upon the touch motion thereby simulating one or more projection and/or recess. The haptic feedback may be varied on at least two portions of the touch interactive device to simulate, virtually by the haptic feedback, moving an amount of material from one portion of the touch interactive device to another different portion of the touch interactive device. The haptic feedback may be varied on at least two portions of the touch interactive device to simulate, virtually by the haptic feedback, changing a first pattern at a first portion of the touch interactive device in correspondence with a change in a second different pattern at a second portion of the touch interactive device. The touch interactive device may comprise a bracelet shape with a plurality of sub-sections along a length of the bracelet shape, where each sub-section is configured to provide an individual virtual shape, and where changing the haptic feedback comprises incrementally increasing or decreasing a size and/or pattern and/or texture of a first virtual shapes in a first one of the sub-sections versus an inverse increase or decrease in a size and/or pattern and/or texture of a second virtual shape in a second adjacent one of the sub-sections. The touch interactive device may comprise a bracelet shape with a plurality of sub-sections along a length of the bracelet shape and a display at the sub-sections, where each sub-section is configured to provide an individual virtual shape, and where changing the haptic feedback comprises incrementally increasing or decreasing a size and/or pattern and/or texture of a first virtual shapes in a first one of the sub-sections versus an inverse increase or decrease in a size and/or pattern and/or texture of a second virtual shape in a second adjacent one of the sub-sections, and where images on the display at the adjacent first and second sub-sections are corresponding changed. The touch interactive device may comprise a bracelet shape with a plurality of sub-sections along a length of the bracelet shape, where each sub-section is configured to provide an individual virtual shape, and where changing the haptic feedback comprises incrementally increasing or decreasing a size and/or pattern and/or texture of a first virtual shapes in a first one of the sub-sections versus an inverse increase or decrease in a size and/or pattern and/or texture of a second virtual shape in a second adjacent one of the sub-sections, and where sounds emanating from the adjacent first and second sub-sections are corresponding changed. The touch interactive device may comprise a plurality of sub-sections along a length, where each sub-section is configured to provide an individual virtual shape, and where changing the haptic feedback comprises increasing a size of a first virtual shape in a first one of the sub-sections and inversely decreasing a size of a second virtual shape in a second one of the sub-sections, where the first and second sub-sections are not adjacent. The touch interactive device may comprise a plurality of sub-sections along a length, where each sub-section is configured to provide an individual virtual shape, and where changing the haptic feedback comprises decreasing a size of a first virtual shape in a first one of the sub-sections and a second virtual shape in a second one of the sub-sections, and inversely increasing a size of a third virtual shape in a third one of the sub-sections an equal amount.

An example embodiment may be provided in an apparatus comprising at least one processor; and at least one non-transitory memory including computer program code, the at least one memory and the computer program code configured to, with the at least one processor, cause the apparatus to: provide haptic feedback to a user along a surface of a touch interactive device of the apparatus in use; and change the haptic feedback to the user during a touch motion on the touch interactive device, where the touch interface device is configured to perform at least one operation based upon at least a portion of the touch motion, where the at least one operation provides information associated with the at least one operation separate from the haptic feedback, and where the changing of the haptic feedback is based at least partially upon at least one of the information and the at least one operation.

The touch interactive device may comprise a touch screen comprising a display and the haptic feedback is provided on the touch screen. The haptic feedback is may comprise to be varied on at least one portion of the touch interactive device to provide a virtual shape on the at least one portion of the touch interactive device; and changing the haptic feedback comprises changing the virtual shape of the at least one portion of the touch interactive device from a first shape to a second shape where a difference between the first shape and the second shape simulates an additive and/or subtractive movement of sand from a first location to a second location. The haptic feedback may be configured to be varied on at least one portion of the touch interactive device to provide virtual shapes having different heights simulating different height piles and/or holes. The haptic feedback may be configured to be varied on at least two portions of the touch interactive device to provide a first virtual shape on a first one of the portions which increases in size while a second virtual shape on a second one of the portions decreases in size based upon the touch motion thereby simulating one or more projection and/or recess. The haptic feedback may be configured to be varied on at least two portions of the touch interactive device to simulate, virtually by the haptic feedback, moving an amount of material from one portion of the touch interactive device to another different portion of the touch interactive device.

An example embodiment may be provided in a non-transitory program storage device, such as memory 32 shown in FIG. 1 for example, readable by a machine, tangibly embodying a program of instructions executable by the machine for performing operations, the operations comprising: providing haptic feedback to a user along a surface of a touch interactive device in use; and changing the haptic feedback to the user during a touch motion on the touch interactive device, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation.

Figure 12:
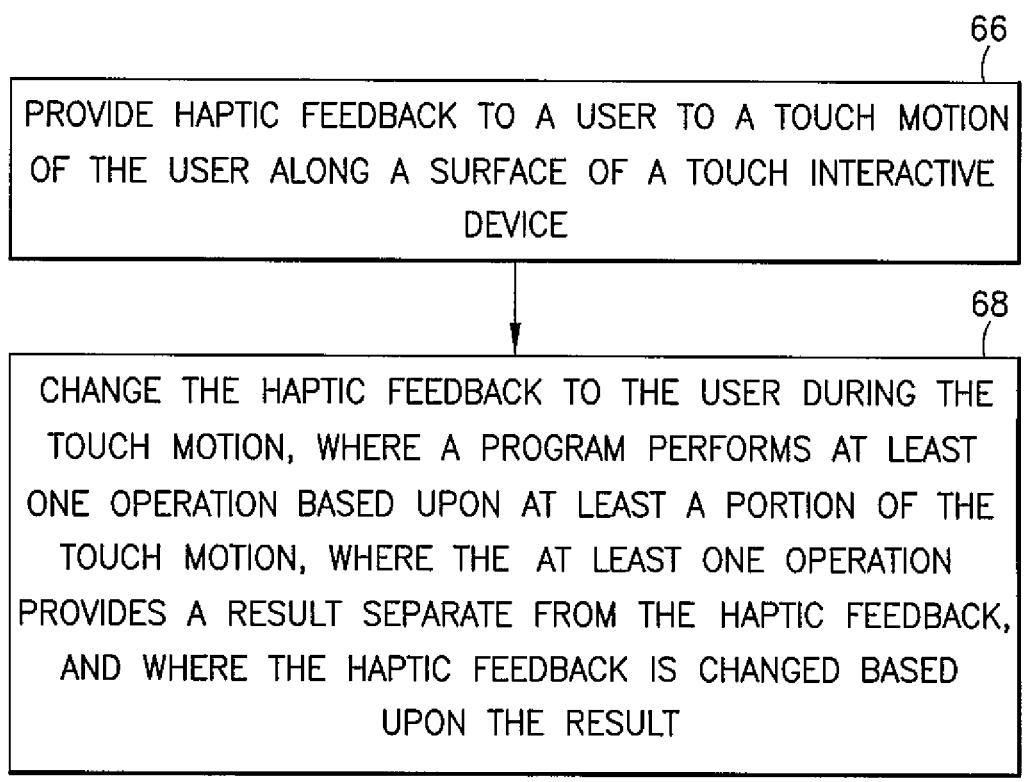
FIG. 12 is a diagram illustrating an example method.

Referring also to FIG. 12, in accordance with one example, the method may comprise providing haptic feedback to a user to a touch motion of the user along a surface of a touch interactive device as indicated by block 66; changing, as indicated by block 68, the haptic feedback to the user during the touch motion, where a program performs at least one operation based upon at least a portion of the touch motion, where the at least one operation provides a result separate from the haptic feedback, and where the haptic feedback is changed based upon the result.

Figure 13:
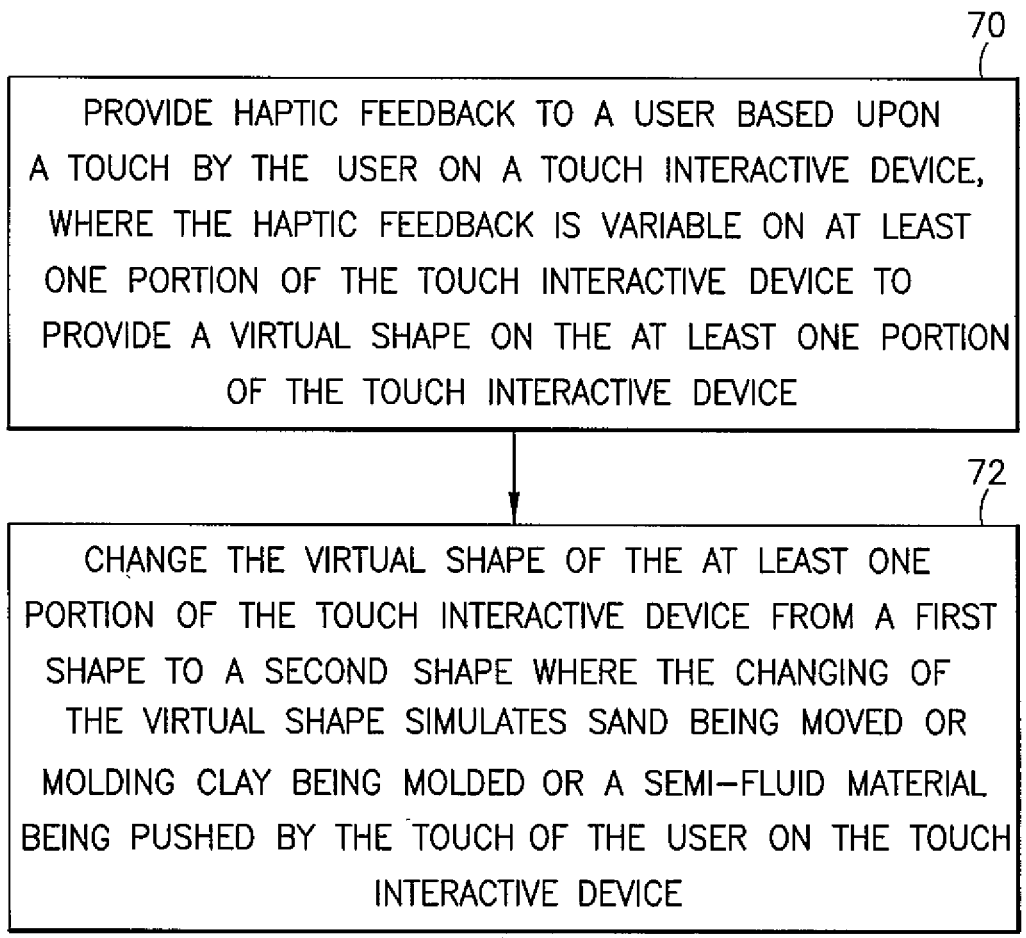
FIG. 13 is a diagram illustrating an example method.

Referring also to FIG. 13, in accordance with another example method, the method may comprise providing haptic feedback to a user based upon a touch by the user on a touch interactive device as indicated by block 70, where the haptic feedback is variable on at least one portion of the touch interactive device to provide a virtual shape on the at least one portion of the touch interactive device; and changing the virtual shape of the at least one portion of the touch interactive device from a first shape to a second shape where the changing of the virtual shape simulates sand being moved or molding clay being molded or a semi-fluid material being pushed by the touch of the user on the touch interactive device as indicated by block 72.

Figure 14:
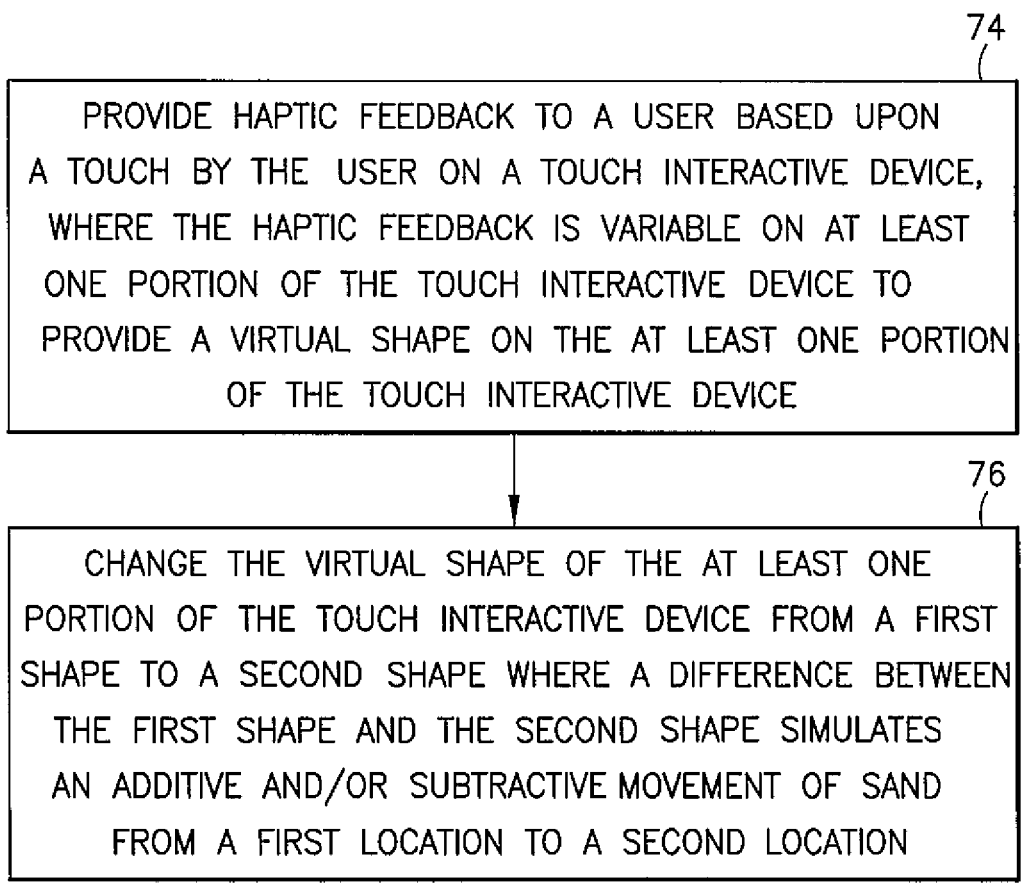
FIG. 14 is a diagram illustrating an example method.

Referring also to FIG. 14, in accordance with another example method, the method may comprise providing haptic feedback to a user based upon a touch by the user on a touch interactive device as indicated by block 74, where the haptic feedback is variable on at least one portion of the touch interactive device to provide a virtual shape on the at least one portion of the touch interactive device; and changing the virtual shape of the at least one portion of the touch interactive device from a first shape to a second shape where a difference between the first shape and the second shape simulates an additive and/or subtractive movement of sand from a first location to a second location as indicated by block 76.

An example apparatus may comprise means for providing haptic feedback to a user along a surface of a touch interactive device of the apparatus in use; and means for changing the haptic feedback to the user during a touch motion on the touch interactive device, where the touch interface device is configured to perform at least one operation based upon at least a portion of the touch motion, where the at least one operation provides information associated with the at least one operation separate from the haptic feedback, and where the changing of the haptic feedback is based at least partially upon at least one of the information and the at least one operation.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
  providing haptic feedback to a user along a surface of a touch interactive device in use; and
  changing the haptic feedback to the user during a touch motion on the touch interactive device, where the touch interactive device is a wearable having a plurality of sub-sections along its length, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation,
  where the haptic feedback is varied on at least two portions of the touch interactive device to provide a first virtual shape on a first one of the portions which increases while a second virtual shape on a second one of the portions decreases based upon the touch motion thereby simulating one or more projection and/or recess.

2. A method as in claim 1 where the touch interactive device comprises a display comprising a touch screen and the haptic feedback is provided on the touch screen.

3. A method as in claim 1 where changing the haptic feedback comprises changing the first virtual shape of the first portion a first shape to a second shape where a difference between the first shape and the second shape simulates an additive movement of sand from a first location to a second location.

4. A method as in claim 1 where the haptic feedback is varied on the first portion to provide the first virtual shape having different heights simulating different height piles and/or holes.

5. A method as in claim 1 where the haptic feedback is varied on the first portion to provide different patterns indicating different organizational content in a software application.

6. A method as in claim 1 where the haptic feedback is varied on the at least two portions of the touch interactive device to simulate, virtually by the haptic feedback, moving an amount of material from the second portion to the first portion.

7. A method as in claim 1 where the haptic feedback is varied on the at least two portions of the touch interactive device to simulate, virtually by the haptic feedback, changing a first pattern at the first portion in correspondence with a change in a second different pattern at the second portion of the touch interactive device.

8. A method as in claim 1 where the touch interactive device comprises a bracelet shape with the plurality of sub-sections along a length of the bracelet shape, where each sub-section is configured to provide an individual virtual shape, and where changing the haptic feedback comprises incrementally increasing a size and/or pattern and/or texture of the first virtual shape in a first one of the sub-sections versus an inverse decrease in a size and/or pattern and/or texture of the second virtual shape in a second adjacent one of the sub-sections.

9. A method as in claim 1 where the touch interactive device comprises a bracelet shape with the plurality of sub-sections along a length of the bracelet shape and a display at the sub-sections, where each sub-section is configured to provide an individual virtual shape, and where changing the haptic feedback comprises incrementally increasing a size and/or pattern and/or texture of the first virtual shape in a first one of the sub-sections versus an inverse decrease in a size and/or pattern and/or texture of the second virtual shape in a second adjacent one of the sub-sections, and where images on the display at the adjacent first and second sub-sections are corresponding changed.

10. A method as in claim 1 where the touch interactive device comprises a bracelet shape with the plurality of sub-sections along a length of the bracelet shape, where each sub-section is configured to provide an individual virtual shape, and where changing the haptic feedback comprises incrementally increasing a size and/or pattern and/or texture of the first virtual shape in a first one of the sub-sections versus an inverse decrease in a size and/or pattern and/or texture of the second virtual shape in a second adjacent one of the sub-sections, and where sounds emanating from the adjacent first and second sub-sections are corresponding changed.

11. A method as in claim 1 where each sub-section is configured to provide an individual virtual shape, and where changing the haptic feedback comprises increasing the first virtual shape in a first one of the sub-sections and inversely decreasing the second virtual shape in a second one of the sub-sections, where the first and second sub-sections are not adjacent.

12. A method as in claim 1 where each sub-section is configured to provide an individual virtual shape, and where changing the haptic feedback comprises increasing a size of a third virtual shape in a third one of the sub-sections.

13. An apparatus comprising:
at least one processor; and
at least one non-transitory memory including computer program code, the at least one memory and the computer program code configured to, with the at least one processor, cause the apparatus to:
provide haptic feedback to a user along a surface of a touch interactive device of the apparatus in use; and
change the haptic feedback to the user during a touch motion on the touch interactive device, where the touch interactive device is a wearable having a plurality of sub-sections along its length, where the touch interface device is configured to perform at least one operation based upon at least a portion of the touch motion, where the at least one operation provides information associated with the at least one operation separate from the haptic feedback, and where the changing of the haptic feedback is based at least partially upon at least one of the information and the at least one operation,
where the haptic feedback is configured to be varied on at least two portions of the touch interactive device to provide a first virtual shape on a first one of the portions which increases while a second virtual shape on a second one of the portions decreases based upon the touch motion thereby simulating one or more projection and/or recess.

14. An apparatus as in claim 13 where the touch interactive device comprises a display comprising a touch screen and the haptic feedback is provided on the touch screen.

15. An apparatus as in claim 13 where the touch interactive device comprises a haptic feedback section which is not a display or touchscreen, and where the at least one memory and the computer program code are configured to provide the haptic feedback to the user along the haptic feedback section.

16. An apparatus as in claim 13 where changing the haptic feedback comprises changing the first virtual shape from a first shape to a second shape where a difference between the first shape and the second shape simulates an additive movement of sand from a first location to a second location.

17. An apparatus as in claim 13 where the haptic feedback is configured to be varied on the first portion to provide the first virtual shape having different heights simulating different height piles and/or holes.

18. An apparatus as in claim 13 where the haptic feedback is configured to be varied on the at least two portions of the touch interactive device to simulate, virtually by the haptic feedback, moving an amount of material from the second portion to the first portion.

19. A non-transitory program storage device readable by a machine, tangibly embodying a program of instructions executable by the machine for performing operations, the operations comprising:
providing haptic feedback to a user along a surface of a touch interactive device in use; and
changing the haptic feedback to the user during a touch motion on the touch interactive device, where the touch interactive device is a wearable having a plurality of sub-sections along its length, where the touch interface device performs at least one operation based upon at least a portion of the touch motion, where the at least one operation provides an information associated with the at least one operation separate from the haptic feedback, and where the changing of the haptic feedback is based at least partially upon at least one of the information and the at least one operation,
where the haptic feedback is varied on at least two portions of the touch interactive device to provide a first virtual shape on a first one of the portions which increases while a second virtual shape on a second one of the portions decreases based upon the touch motion thereby simulating one or more projection and/or recess.

* * * * *